(12) United States Patent
Takemoto et al.

(10) Patent No.: US 7,653,080 B2
(45) Date of Patent: Jan. 26, 2010

(54) STATION SIDE COMMUNICATION DEVICE

(75) Inventors: Michiya Takemoto, Tokyo (JP); Masaki Tanaka, Tokyo (JP); Ken Murakami, Tokyo (JP); Hiroaki Mukai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 574 days.

(21) Appl. No.: 10/563,157

(22) PCT Filed: Sep. 11, 2003

(86) PCT No.: PCT/JP03/11620

§ 371 (c)(1),
(2), (4) Date: Jan. 4, 2006

(87) PCT Pub. No.: WO2005/027428

PCT Pub. Date: Apr. 24, 2005

(65) Prior Publication Data

US 2006/0159040 A1    Jul. 20, 2006

(51) Int. Cl.
H04B 7/212 (2006.01)
(52) U.S. Cl. .................................................. 370/442
(58) Field of Classification Search ............ 370/395.21, 370/395.41, 395.42, 442
See application file for complete search history.

(56) References Cited

U.S. PATENT DOCUMENTS

| | | | |
|---|---|---|---|
| 5,673,253 A | | 9/1997 | Shaffer |
| 5,793,416 A * | | 8/1998 | Rostoker et al. ......... 348/14.13 |
| 6,078,568 A * | | 6/2000 | Wright et al. ............... 370/312 |
| 6,785,252 B1 * | | 8/2004 | Zimmerman et al. ....... 370/337 |
| 6,986,156 B1 * | | 1/2006 | Rodriguez et al. ........... 725/95 |
| 2002/0080816 A1 * | | 6/2002 | Spinar et al. ............... 370/449 |
| 2002/0152305 A1 * | | 10/2002 | Jackson et al. ............. 709/224 |
| 2003/0007212 A1 | | 1/2003 | Sala et al. |

FOREIGN PATENT DOCUMENTS

| | | |
|---|---|---|
| EP | 1 017 244 A1 | 7/2000 |
| JP | 10-004409 | 1/1998 |
| JP | 2000-244527 | 9/2000 |

(Continued)

OTHER PUBLICATIONS

Yoshihara et al. "Dynamic Bandwidth Allocation Algorithm for GE-PON", International Conference on Optical Internet 2002.

(Continued)

*Primary Examiner*—Derrick W Ferris
*Assistant Examiner*—Mohammad Anwar
(74) *Attorney, Agent, or Firm*—Oblon, Spivak, McClelland, Maier & Neustadt, L.L.P.

(57) ABSTRACT

An allocation determining unit determines a bandwidth allocation for each of a plurality of subscriber devices in each data-collection cycle. A history managing unit takes a history of a request increment from a bandwidth request amount acquired from more than one time of data collections and an allocation amount allocated by the allocation determining unit for the bandwidth request amount, and presents a bandwidth request amount for the allocation determination to the allocation determining unit by dividing the bandwidth request amount into a plurality of request increments indicated by the history.

12 Claims, 13 Drawing Sheets

FOREIGN PATENT DOCUMENTS

| | | |
|---|---|---|
| JP | 2001-053711 | 2/2001 |
| JP | 2001-111588 | 4/2001 |
| JP | 2001-148716 | 5/2001 |
| JP | 2001-251331 | 9/2001 |
| JP | 2002-300180 | 10/2002 |
| JP | 2003-87281 | 3/2003 |
| JP | 2003-87283 | 3/2003 |
| JP | 2003-209572 | 7/2003 |

OTHER PUBLICATIONS

John Dunlop, et al., "Performance of a Statistically Multiplexed Access Mechanism for a TDMA Radio Interface", IEEE Personal Communications, XP 000506582, vol. 2, No. 3, Jun. 1, 1995, pp. 56-64.

* cited by examiner

US 7,653,080 B2

STATION SIDE COMMUNICATION DEVICE

CROSS-REFERENCE TO A RELATED APPLICATION

This application is a 371 national stage of International Patent Application No. PCT/JP2003/11620 filed Sep. 11, 2003.

TECHNICAL FIELD

The present invention relates to a station-side communicating apparatus that can dynamically allocate upload bandwidth to a plurality of subscriber devices.

BACKGROUND ART

As a system in which a station-side communicating apparatus connected to a communication network performs one-to-N communication with a plurality of subscriber devices via a time-division-multiple-access (TDMA) line to connect the subscriber devices to the communication network, there are various communication systems, such as a wireless communication system, a passive optical network (hereinafter, "a PON system"), and a local-area-network (LAN) system. In this type of communication system, an upload bandwidth that is used by the subscriber devices to transmit packet data to the station-side communicating apparatus is shared by the subscriber devices.

Various methods have been proposed for the station-side communicating apparatus to allocate the upload bandwidth in response to bandwidth requests from the subscriber devices and according to service levels of the subscriber devices. The first literature Japanese application patent laid-open publication No. 2001-53711, for example, discloses the bandwidth allocation method in the wireless communication system. The second literature "Dynamic Bandwidth Allocation Algorithm for GE-PON (International Conference on Optical Internet ((OJN2002))", for example, discloses the bandwidth allocation method in the PON system. The third literature Japanese application patent laid-open publication No. 2000-244527, for example, discloses the bandwidth allocation method in the LAN system.

For easy understanding of the present invention, the conventional dynamic bandwidth-allocation method will be described below (FIGS. 1 to 4) with reference to the PON system disclosed in the second literature. Note that because the second literature does not clearly specify the transmission type, the description below uses the transmission type disclosed in the third literature. FIG. 1 is a block diagram for illustrating a general configuration of the PON system. FIG. 2 is a block diagram for illustrating an example of a configuration of a subscriber terminating apparatus shown in FIG. 1. FIG. 3 is a block diagram for illustrating an example of a configuration of a portion of a station-side communicating apparatus shown in FIG. 1, which relates to a bandwidth allocation. FIG. 4 is a flowchart of a processing procedure for a conventional dynamic bandwidth-allocation method.

As shown in FIG. 1, the PON system includes a station-side communicating apparatus 1, and a plurality of subscriber devices (hereinafter, "subscriber terminating apparatuses") 2a, 2b, and 2c. The subscriber terminating apparatuses 2a, 2b, and 2c connect to the station-side communicating apparatus 1 through an optical transmission path (optical fiber 3, optical coupler 4, and optical fibers 5a, 5b, and 5c). More specifically, the optical fiber 3 connected to the station-side communicating apparatus 1 is divided into a plurality of optical fibers 5a, 5b, and 5c at the optical coupler 4. The optical fibers 5a, 5b, and 5c connect to the subscriber terminating apparatuses 2a, 2b, and 2c, respectively. The station-side communicating apparatus 1 connects to a network 6. The subscriber terminating apparatuses 2a, 2b, and 2c connect to, for example, terminal devices 7a, 7b, and 7c, respectively.

The station-side communicating apparatus 1 exchanges packet data with the subscriber terminating apparatuses 2a, 2b, and 2c through the TDMA line. During each data-collection cycle, the station-side communicating apparatus 1 obtains request data amount sent from the subscriber terminating apparatuses 2a, 2b, and 2c. According to the request data amount, the station-side communicating apparatus 1 allocates the upload bandwidth to each of the subscriber terminating apparatuses 2a, 2b, and 2c. The station-side communicating apparatus 1 can set the contract bandwidth for each of the subscriber terminating apparatuses 2a, 2b, and 2c.

Each of the subscriber terminating apparatuses 2a, 2b, and 2c includes a buffer memory unit 22 that stores the packet data input from a terminal device. The subscriber terminating apparatuses 2a, 2b, and 2c inform the station-side communicating apparatus 1 of the data amount accumulated in the buffer memory unit 22 as the bandwidth request. When each of the subscriber terminating apparatuses has a plurality of terminal devices connected thereto, it includes a buffer memory unit for each of the terminal devices, and informs the station-side communicating apparatus 1 of the accumulated data amount in each buffer memory unit.

As shown in FIG. 2, the subscriber terminating apparatus 2 includes a data receiving unit 21, the buffer memory unit 22, a data-amount counter unit 23, a control-signal generating unit 24, a transmission-timing adjusting unit 25, and a data transmitting unit 26.

The data receiving unit 21 stores the packet data input from the terminal device in the buffer memory unit 22. The data-amount counter unit 23 counts data amount stored in the buffer memory unit 22 and informs the amount to the control-signal generating unit 24. The control-signal generating unit 24 uses the data amount counted by the data-amount counter unit 23 as a basis to generate a control signal for a request to the station-side communicating apparatus 1 for the bandwidth. The data transmitting unit 26 transmits the control signal to the station-side communicating apparatus 1 at the timing specified by the transmission-timing adjusting unit 25. The data transmitting unit 26 also transmits the packet data accumulated in the buffer memory unit 22 to the station-side communicating apparatus 1. The data transmitting unit 26 transmits the packet data in the order in which the data is stored in the buffer memory unit 22 at the own transmission timing specified by a transmission-timing adjusting unit 55.

In this manner, the subscriber terminating apparatus 2 can inform the station-side communicating apparatus 1 of the request data amount by transmitting the control signal. The subscriber terminating apparatus 2 can also transmit the packet data input from the terminal device to the station-side communicating apparatus 1.

As shown in FIG. 3, the station-side communicating apparatus 1 has a configuration for the dynamic bandwidth-allocation. The configuration includes a control-signal receiving unit 30, a request-data-amount collecting unit 31, an allocation determining unit 32, a bandwidth adjusting unit 33, a transmission-permission-signal generating unit 34, and a control-signal transmitting unit 35. The station-side communicating apparatus 1 dynamically allocates the upload bandwidth in the sequence shown in FIG. 4. According to FIG. 4 and referring to FIG. 3, a description is given of how the station-side communicating apparatus 1 dynamically allocates the upload bandwidth.

As shown in FIG. 4, the control-signal receiving unit 30 receives the control signal which includes the stored data amount transmitted by the subscriber terminating apparatus. After receiving the control signal, the control-signal receiving unit 30 informs the request-data-amount collecting unit 31 of the stored data amount of the subscriber terminating apparatus that is indicated in the control signal. The request-data-amount collecting unit 31 thus collects the request data amount from all the subscriber terminating apparatuses (step ST1).

For the request data amount from each subscriber terminating apparatus held in the request-data-amount collecting unit 31, the allocation determining unit 32 sequentially determines the allocation (step ST2) in the determination order previously set by the bandwidth adjusting unit 33. The allocation determining unit 32 determines the allocation by determining whether the allocation to the selected subscriber terminating apparatus #n causes the total allocation amount more than a bandwidth-allocation amount previously set per one bandwidth-update cycle (step ST3).

If the allocation is possible to the selected subscriber terminating apparatus #n ("NO" at step ST3), the allocation determining unit 32 permits the allocation to the subscriber terminating apparatus #n, and informs the transmission-permission-signal generating unit 34 of the request data amount as the transmission-permitted amount (step ST4), then the flow proceeds to step ST5.

At step ST5, the allocation determining unit 32 determines whether the allocation is completed for all the subscriber terminating apparatuses. Until the allocation is completed for all the subscriber terminating apparatuses ("NO" at step ST5), the allocation determining unit 32 performs the allocation to all the subscriber terminating apparatuses by repeating the process from step ST2 to step ST4. If the allocation is completed for the entire subscriber terminating apparatuses ("YES" at step ST5), the flow proceeds to the operation of the transmission-permission-signal generating unit 34 (step ST6).

In repeating the processes from step ST2 to step ST4, if the allocation is not performed to the selected subscriber terminating apparatus #n ("YES" at step ST3), the allocation determining unit 32 informs accordingly the transmission-permission-signal generating unit 34. The allocation determining unit 32 then stops the allocation determination to the subscriber terminating apparatus #n, then the flow proceeds to step ST6. This means that a subscriber terminating apparatus occurs which does not receive the allocation determination.

The transmission-permission-signal generating unit 34 generates the transmission-permission-signal which indicates the transmission-permitted amount informed from the allocation determining unit 32. The control-signal transmitting unit 35 transmits the transmission-permission-signal to the subscriber terminating apparatus to which the allocation is permitted (step ST6). If there is a subscriber terminating apparatus to which the allocation is not performed, the transmission-permission-signal generating unit 34 informs accordingly that subscriber terminating apparatus.

Based on the data amount which is determined to be allocatable by the allocation determining unit 32 and on the contract bandwidth of the each of the subscriber terminating apparatuses, the bandwidth adjusting unit 33 determines (or updates) the order in which the next allocation determination is performed (step ST7). The above-described bandwidth-update cycle is the cycle during which the bandwidth adjusting unit 33 determines (or updates) the order in which the allocation determination is performed.

The dynamic bandwidth-allocation method in the conventional technology can periodically perform the set of the processes shown in FIG. 4 and can dynamically allocate the bandwidth according to the bandwidth request from each subscriber terminating apparatus. If more bandwidth is allocated to the subscriber terminating apparatus than its contract bandwidth, its allocation order can be postponed as lower priority in the next allocation determination, thereby limiting the bandwidth allocation. If less bandwidth is allocated, on the other hand, to the subscriber terminating apparatus than its contract bandwidth, its allocation order can be brought forward as higher priority in the next allocation determination, thereby increasing the bandwidth allocation.

The dynamic bandwidth-allocation method in the conventional technology can set the data amount requested from each subscriber terminating apparatus as the transmission-permitted amount to eliminate the useless bandwidth allocation, thereby making it possible to effectively use the bandwidth shared by the subscriber terminating apparatuses.

In the dynamic bandwidth-allocation method in the conventional technology, however, if a plurality of subscriber terminating apparatuses provides a large request data amount, an allocation permitted to a small number of subscriber terminating apparatuses may cause the total allocation amount more than a bandwidth-allocation amount per one bandwidth-update cycle, permitting no allocation to the remaining subscriber terminating apparatuses. Some subscriber terminating apparatuses have thus less opportunity for allocation, thereby increasing the time for the packet data input from the terminal device to be output from the subscriber terminating apparatus.

To solve the above-described problems, it is readily inferred that a portion of each request data amount may preferably be allocated. In this case, however, the station-side communicating apparatus needs to determine the transmission-permitted amount without considering the delimitation in the variable-length packet data which is stored in the buffer memory unit in the subscriber terminating apparatus. When the station-side communicating apparatus determines the transmission-permitted amount for each subscriber terminating apparatus without considering the delimitation in the variable length packet, the subscriber terminating apparatuses need to separate the variable-length packet data stored in the buffer memory unit to use all of the allocation permission. The station-side communicating apparatus needs a means for differentiating the separated packet data and non-separated packet data and a means for recombining the separated packet data. A problem thus arises in which redundant functions have to be added to the station-side communicating apparatus and subscriber terminating apparatus.

To transmit the packet data with the same delimitation as that in the variable-length packet data stored in the buffer memory unit, the subscriber terminating apparatuses need to use not all the transmission-permitted amount. The subscriber terminating apparatuses alternatively need to use only a portion of the transmission-permitted amount that allows the transmission of the packet data amount without separating it. In this case, the remaining portion of the transmission-permitted amount is unnecessary allocation, which may prevent the effective use of the upload bandwidth shared by the subscriber terminating apparatuses.

As described above, the dynamic bandwidth-allocation method in the conventional technology sets the request data amount as the transmission-permitted amount for the purpose of effectively using the shared bandwidth, which leads to a longer data-transmission waiting time of the subscriber terminating apparatuses. On the other hand, increasing the allocation occasions to decrease the data-transmission waiting time may cause a problem in which redundant functions need to be added or unnecessary allocation need to be generated for effectively using the shared bandwidth.

The present invention is accomplished in light of the above-described problems. An object of this invention is to provide a station-side communicating apparatus which can detect packet data delimitation in the request data amount and can allow the allocation for a portion of the request data amount, thereby effectively using the shared bandwidth and allocating the upload bandwidth to decrease the data-transmission waiting time.

DISCLOSURE OF INVENTION

According to the present invention, a station-side communicating apparatus performs one-to-N communication with a plurality of subscriber devices via a time-division-multiple-access line, and controls allocation of upload bandwidth shared by the subscriber devices by acquiring bandwidth request amount from the subscriber devices. The station-side communicating apparatus includes an allocation determining unit that determines a bandwidth allocation for each of the subscriber devices in each data-collection cycle; and a history managing unit that takes a history of a request increment from the bandwidth request amount acquired from more than one time of data collections and an allocation amount allocated by the allocation determining unit for the bandwidth request amount, and presents bandwidth request amount to be a target for the allocation determination to the allocation determining unit by dividing the bandwidth request amount into a plurality of request increments indicated by the history.

According to the present invention, it is possible to manage the history of the request increment in the bandwidth request amount transmitted by a plurality of subscriber devices, and separate the bandwidth request amount as a determination object into a plurality of request increments indicated by the history. The request increment corresponds to the packet data amount which remains in the subscriber device.

According to the present invention, the allocation determining unit detects a boundary between the request increments in the bandwidth request amount that is presented by the history managing unit for each of the subscriber devices, and executes the bandwidth allocation for a portion of the bandwidth request amount.

According to the present invention, it is possible to detect the boundary between a plurality of request increments in the bandwidth request amount as the determination object, thereby allowing the bandwidth allocation for a portion of the bandwidth request amount. The request increment corresponds to the packet data amount which remains in the subscriber device as mentioned above, so that the detection of the boundary between the request increments is equivalent to the detection of the delimitation of the packet data which remains in the subscriber device.

According to the present invention, the allocation determining unit detects a boundary between the request increments in the bandwidth request amount that is presented by the history managing unit for each of the subscriber devices, and determines the allocation amount from the request increments when executing the bandwidth allocation for a portion of the bandwidth request amount.

According to the present invention, it is possible to determine the bandwidth-allocation amount allocated to a portion of the bandwidth request amount from a plurality of request increments. That is, the allocation can be performed in the packet data unit which remains in the subscriber device. The unnecessary allocations are thus not performed, thereby making it possible to effectively use the shared bandwidth for all the subscriber devices, to increase the allocation occasions, and to decrease the transmission waiting time.

According to the present invention, when executing the bandwidth allocation for a portion of the bandwidth request amount by detecting a boundary between the request increments in the bandwidth request amount that is presented by the history managing unit for each of the subscriber devices, if the bandwidth request amount has a remaining portion for which the allocation is not performed in the present bandwidth-update cycle, the allocation determining unit determines a bandwidth to be allocated to a corresponding subscriber device in a next bandwidth-update cycle in advance using the remaining portion.

According to the present invention, it is possible to calculate the transmission-permitted amount allocated to the corresponding subscriber device from the remaining data amount left in the allocation for a portion of the bandwidth request amount, before the data collection in the next bandwidth-update cycle, thereby decreasing the load of the bandwidth allocation process in the relevant station-side communicating apparatus.

According to the present invention, the history managing unit manages, when taking the history for each of the subscriber devices, a temporal variation of the bandwidth request amount, and disposes the request increments in the bandwidth request amount to be presented to the allocation determining unit in such a manner that a temporal relation is recognizable between the request increments, based on the temporal variation of the bandwidth request amount; and the allocation determining unit sequentially determines the allocation for the request increments in the bandwidth request amount that is presented by the history managing unit for each of the subscriber devices from an oldest request increment.

According to the present invention, it is possible to dispose a plurality of request increments in the bandwidth request amount in the order in which the packet data is input in the subscriber device. The present invention can thus start to determine the allocation for from the request increment which corresponds to the more-early-input packet data, that is, the packet data with a longer transmission waiting time, thereby decreasing the transmission waiting time of the packet data.

According to the present invention, the history managing unit manages, when taking the history for each of the subscriber devices, a temporal variation of the bandwidth request amount, and detects a transmission delay time of a packet data remains in the subscriber device, based on the temporal variation of the bandwidth request amount.

According to the present invention, the temporal variation in the bandwidth request amount indicates the increasing and decreasing in the bandwidth request amount which is obtained from the subscriber device in each data-collection cycle, which can thus allow the detection of the transmission delay time during which the packet data remains in the subscriber device.

According to the present invention, the history managing unit manages, when taking the history for each of the subscriber devices, a temporal variation of the bandwidth request amount, detects a transmission delay time of a packet data remains in the subscriber device, based on the temporal variation of the bandwidth request amount, and when the detected transmission delay time is large, and selects, as the bandwidth request amount to be presented to the allocation determining unit, the bandwidth request amount corresponding to the packet data with the large transmission delay time.

According to the present invention, it is possible to preferentially perform the allocation for the bandwidth request amount which corresponds to the packet data with a larger transmission delay time, thereby decreasing the transmission delay time of the packet data.

According to the present invention, the allocation determining unit classifies the request increments in the bandwidth request amount that is presented by the history managing unit for each of the subscriber devices into a plurality of groups with different priorities based on contract differences with respect to the subscriber devices, and executes the bandwidth allocation for the request increments from a group with a higher priority.

According to the present invention, it is possible to generate the delay difference for each subscriber device, thereby incorporating the delay time in the service.

BEST MODES FOR CARRYING OUT THE PRESENT INVENTION

Exemplary embodiments of a station-side communicating apparatus according to the present invention will be described below in detail with reference to the accompanying drawings.

Figure 1:
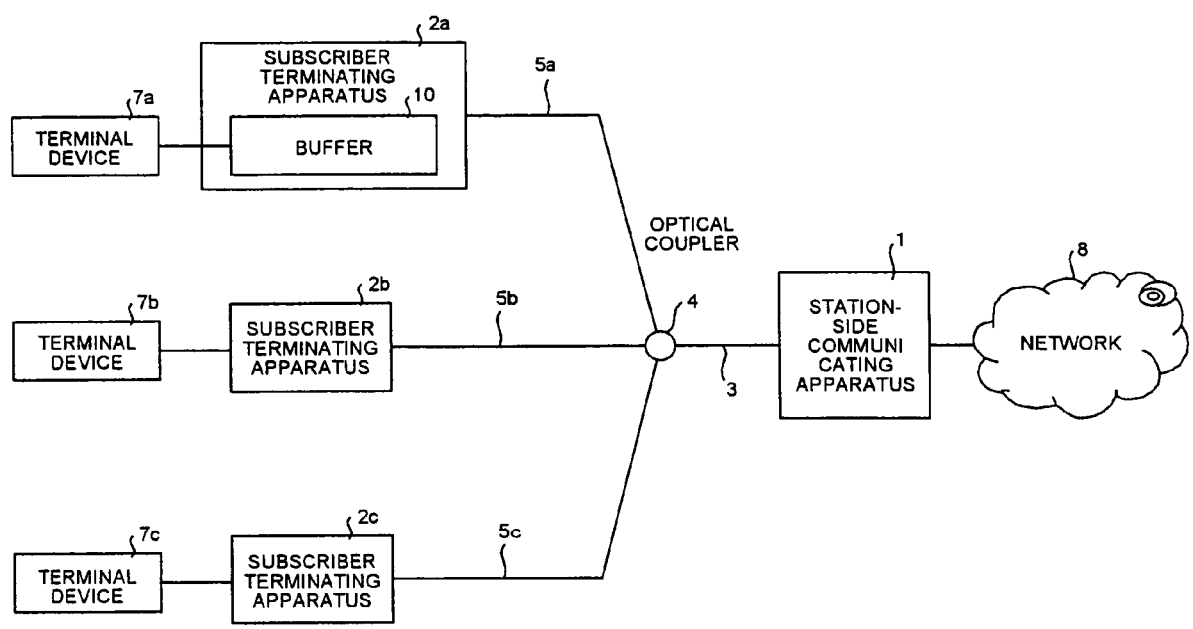
FIG. 1 is a block diagram for illustrating a general configuration of a PON system.
Figure 2:
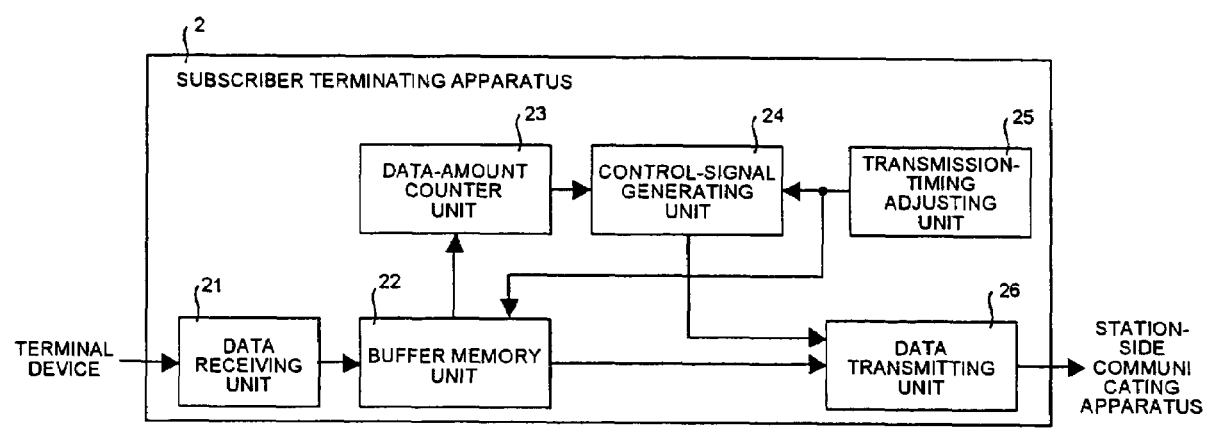
FIG. 2 is a block diagram for illustrating an example of a configuration of a subscriber terminating apparatus shown in FIG. 1.
Figure 3:
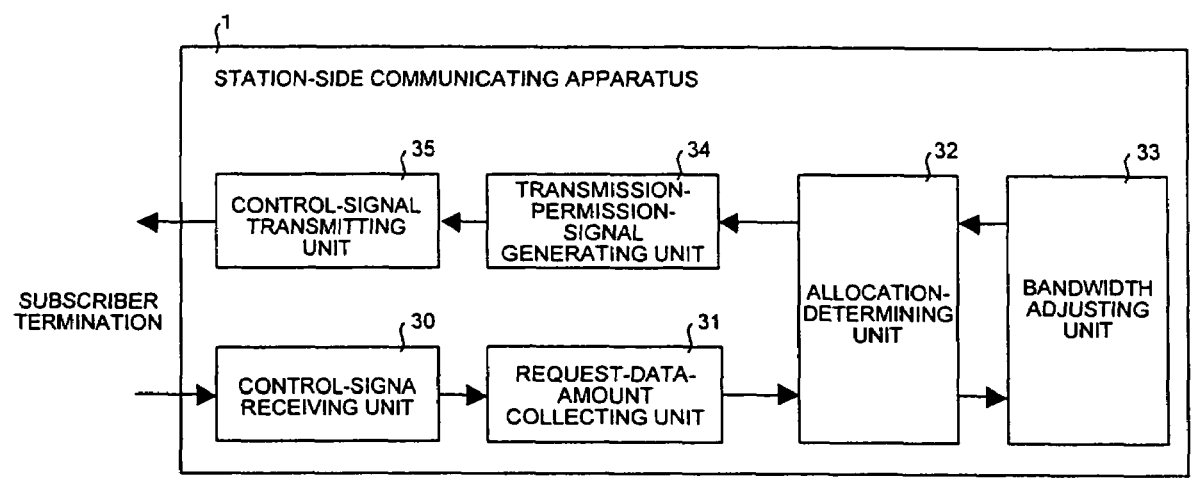
FIG. 3 is a block diagram for illustrating an example of a configuration of a portion of a station-side communicating apparatus shown in FIG. 1, which relates to a bandwidth allocation.
Figure 4:
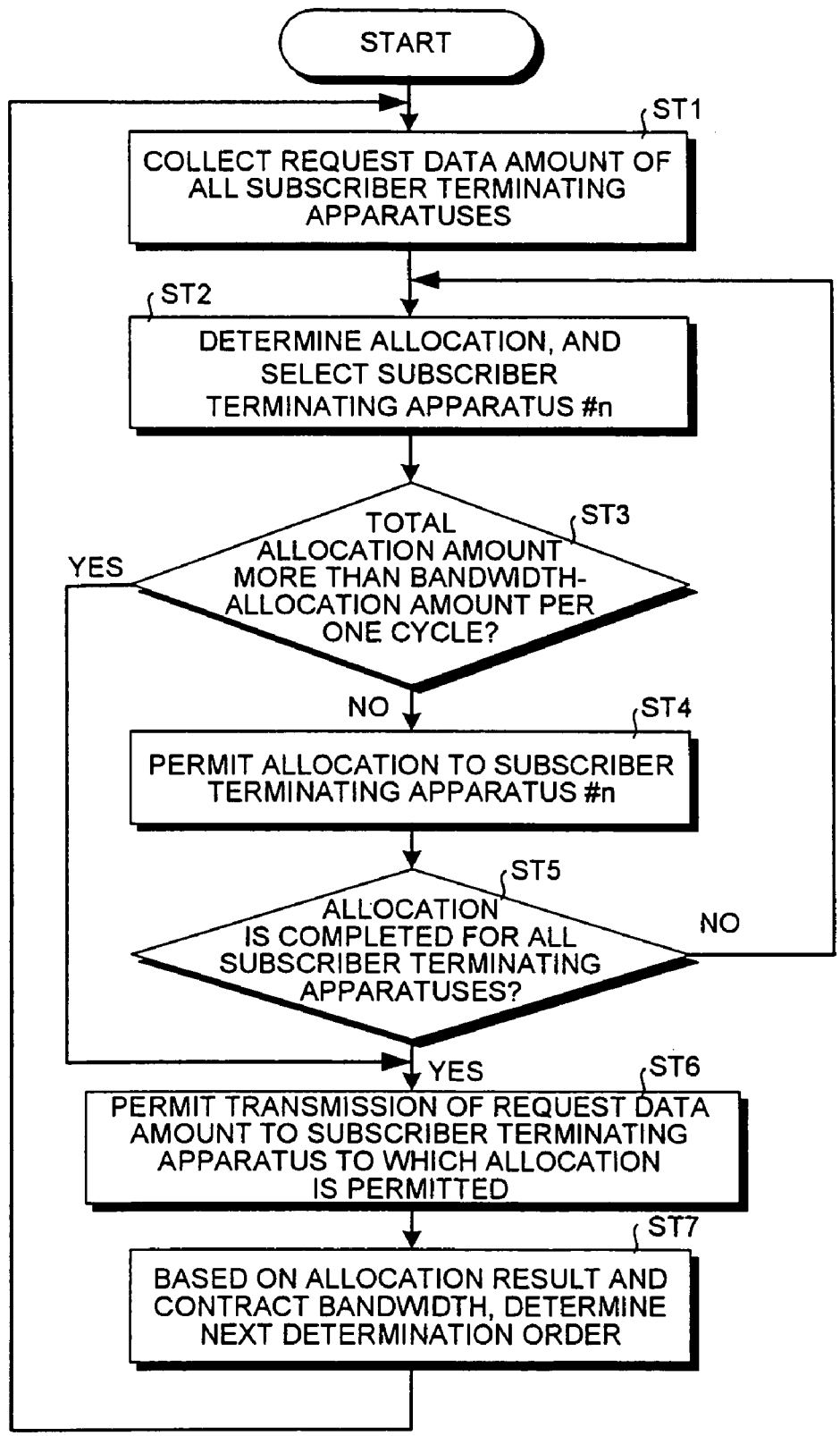
FIG. 4 is a flowchart of a processing procedure for a conventional dynamic bandwidth-allocation method.
Figure 5:
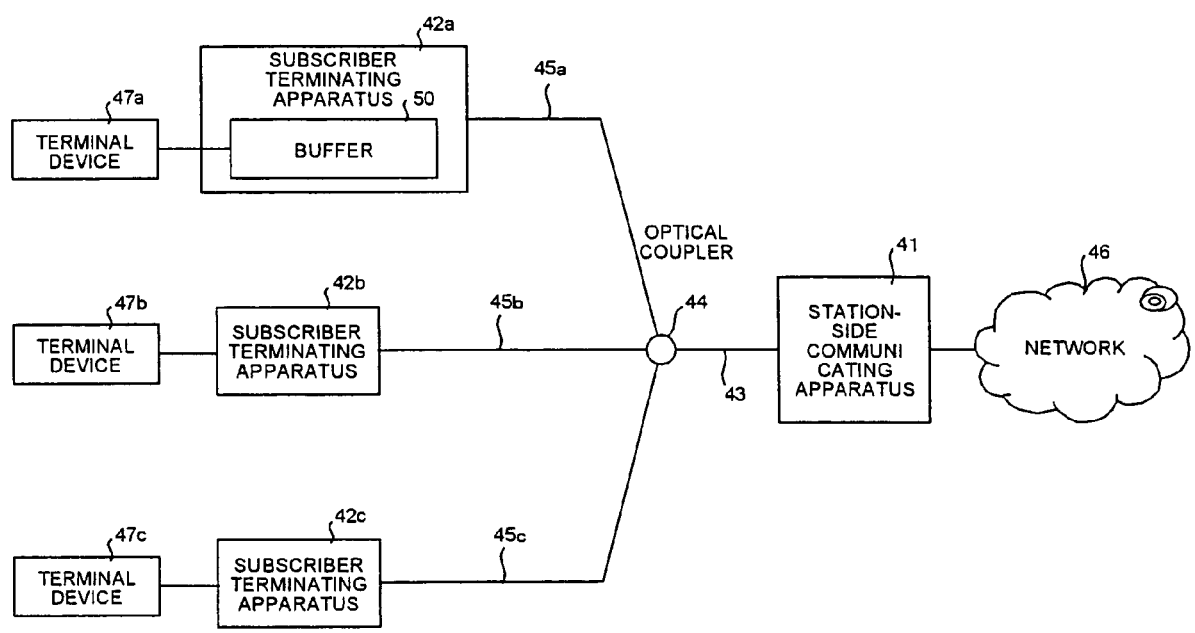
FIG. 5 is a block diagram of a PON system including a station-side communicating apparatus according to a first embodiment of the present invention.

FIG. 5 is a block diagram of a PON system including a station-side communicating apparatus according to a first embodiment of the present invention. The PON system includes a station-side communicating apparatus 41, and a plurality of subscriber devices (hereinafter, "subscriber terminating apparatuses") 42a, 42b, and 42c. The subscriber terminating apparatuses 42a, 42b, and 42c connect to the station-side communicating apparatus 41 through an optical transmission path (optical fiber 43, optical coupler 44, and optical fibers 45a, 45b, and 45c). More specifically, the optical fiber 43 connected to the station-side communicating apparatus 41 is divided into a plurality of optical fibers 45a, 45b, and 45c at the optical coupler 44. The optical fibers 45a, 45b, and 45c connect to the subscriber terminating apparatuses 42a, 42b, and 42c, respectively. The station-side communicating apparatus 41 connects to a network 46. The subscriber terminating apparatuses 42a, 42b, and 42c connect to, for example, terminal devices 47a, 47b, and 47c, respectively.

The station-side communicating apparatus 41 exchanges packet data with the subscriber terminating apparatuses 42a, 42b, and 42c through the TDMA line. During each data-collection cycle, the station-side communicating apparatus 41 obtains the data amount sent from the subscriber terminating apparatuses 42a, 42b, and 42c. The station-side communicating apparatus 41 saves the data amount for some cycles for each subscriber terminating apparatus and keeps a history. According to the history, the station-side communicating apparatus 41 allocates the upload bandwidth to each of the subscriber terminating apparatuses 42a, 42b, and 42c. The station-side communicating apparatus 41 can set the contract bandwidth for each of the subscriber terminating apparatuses 42a, 42b, and 42c.

The subscriber terminating apparatuses 42a, 42b, and 42c each include a buffer memory unit 52 which stores the packet data input from a terminal device. The subscriber terminating apparatuses 42a, 42b, and 42c inform the station-side communicating apparatus 41 of the data amount accumulated in the buffer memory unit 52 as the bandwidth request. Note that when each subscriber terminating apparatus has a plurality of terminal devices connected thereto, it includes a buffer memory unit for each terminal device. The subscriber terminating apparatus then informs the station-side communicating apparatus 1 of the accumulated data amount in each buffer memory unit.

Figure 6:
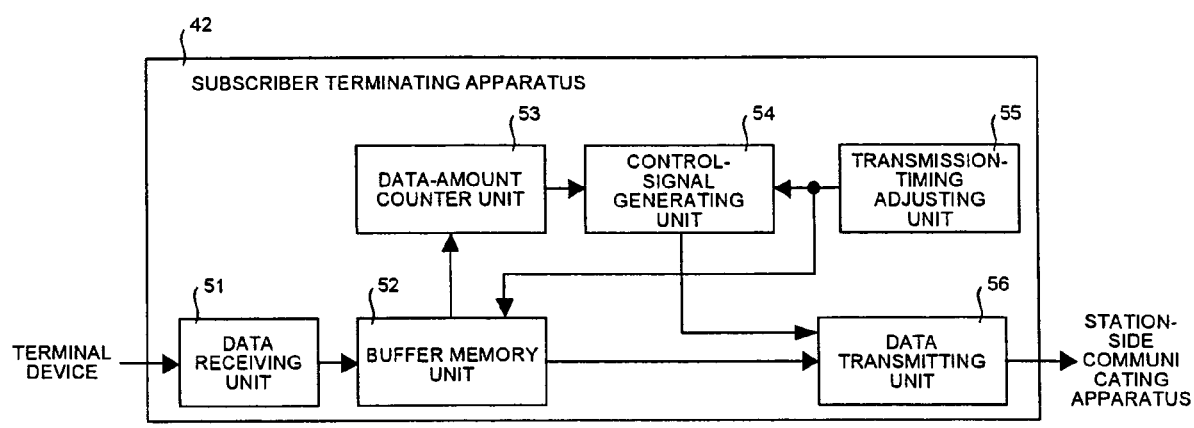
FIG. 6 is a block diagram for illustrating an example of a configuration of a subscriber terminating apparatus shown in FIG. 5.

FIG. 6 is a block diagram for illustrating an example of a configuration of the subscriber terminating apparatus shown in FIG. 5. The subscriber terminating apparatus 42 includes a data receiving unit 51, the buffer memory unit 52, a data-amount counter unit 53, a control-signal generating unit 54, the transmission-timing adjusting unit 55, a data transmitting unit 56. The subscriber terminating apparatus 42 can inform the station-side communicating apparatus 41 of the request data amount. The station-side communicating apparatus 41 can also transmit the packet data input from the terminal device to the station-side communicating apparatus 41.

The transmission-timing adjusting unit 55 generates a timing at which the control signal generated by the control-signal generating unit 54 is transmitted. The transmission-timing adjusting unit 55 provides the timing to the control-signal generating unit 54. The transmission-timing adjusting unit 55 also sets the own transmission timing in the TDMA line. The transmission-timing adjusting unit 55 provides the timing to the buffer memory unit 52.

The data receiving unit 51 stores in the buffer memory unit 52 the packet data input from the terminal device. The data-amount counter unit 53 counts and sends the data amount stored in the buffer memory unit 52 to the control-signal generating unit 54. The control-signal generating unit 54 uses the data amount counted by the data-amount counter unit 53 as a basis to generate a control signal for a request to the station-side communicating apparatus 41 for the bandwidth. The data transmitting unit 56 transmits the control signal to the station-side communicating apparatus 41 at the timing specified by the transmission-timing adjusting unit 55. The data transmitting unit 56 also transmits the packet data accumulated in the buffer memory unit 52 to the station-side communicating apparatus 41. The data transmitting unit 56 transmits the packet data in the order in which the data is stored in the buffer memory unit 52 at the timing specified by the transmission-timing adjusting unit 55.

Figure 7:
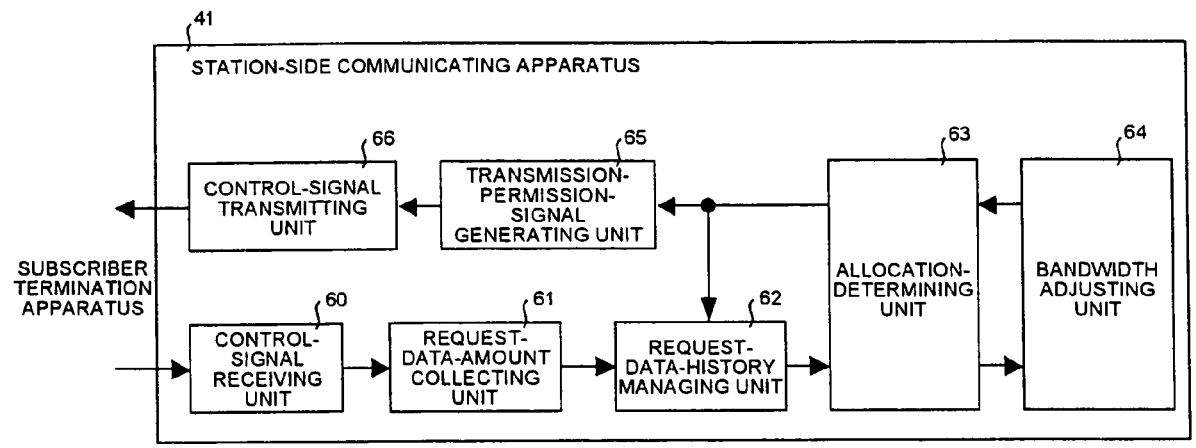
FIG. 7 is a block diagram for illustrating an example of a configuration of a portion of a station-side communicating apparatus shown in FIG. 5, which relates to a bandwidth allocation.

FIG. 7 is a block diagram for illustrating an example of a configuration of a portion of the station-side communicating apparatus shown in FIG. 5, which relates to a bandwidth allocation. The station-side communicating apparatus 41 has a configuration for the dynamic bandwidth-allocation. The configuration includes a control-signal receiving unit 60, a request-data-amount collecting unit 61, a request-data-history managing unit 62, an allocation determining unit 63, a bandwidth adjusting unit 64, a transmission-permission-signal generating unit 34, and the control-signal transmitting unit 35.

Figure 8:
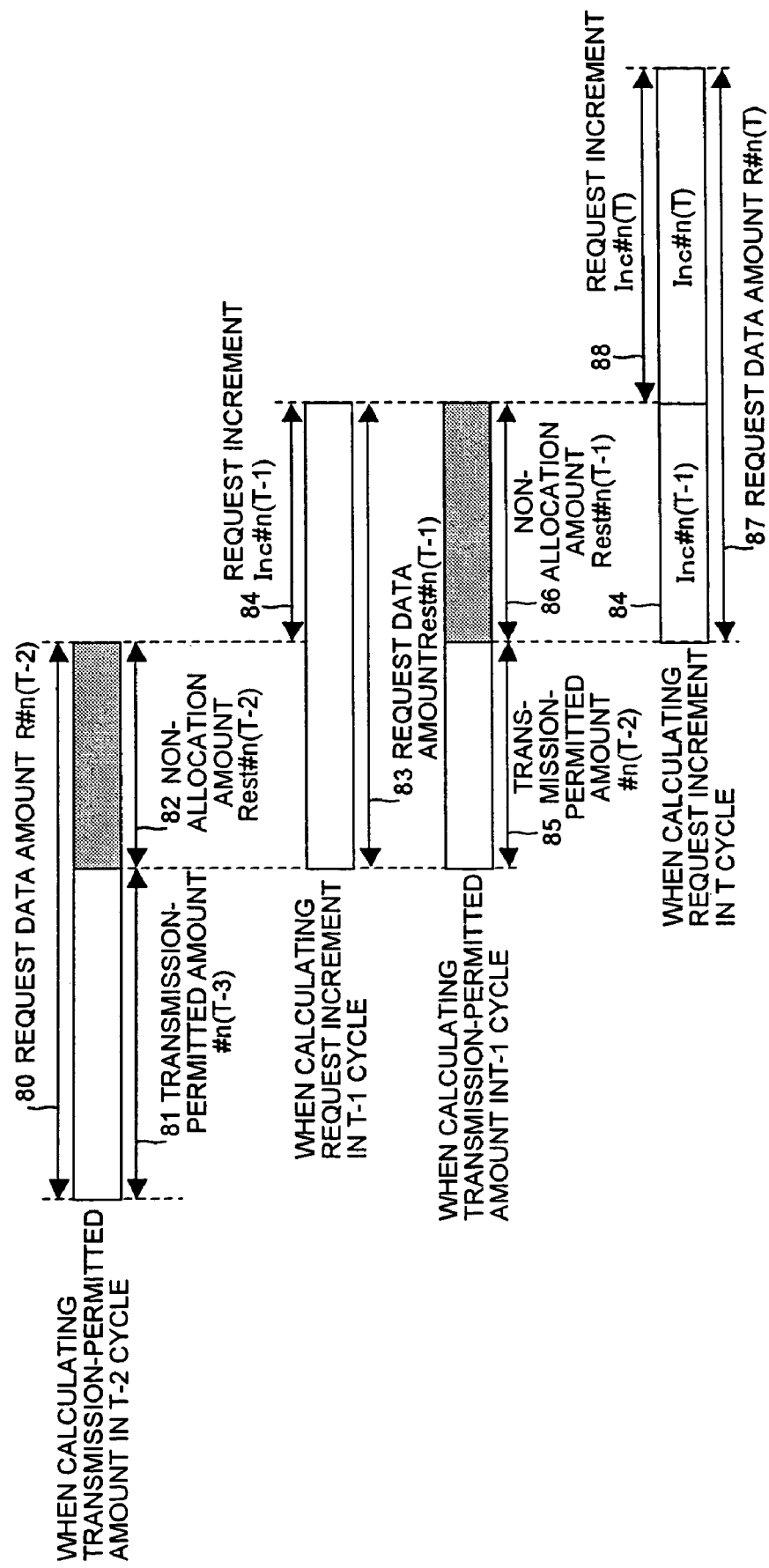
FIG. 8 is a schematic for illustrating a history-list creating operation in a request-data-history managing unit and a packet-data-delimitation detecting operation in an allocation determining unit included in the station-side communicating apparatus shown in FIG. 5.
Figure 9:
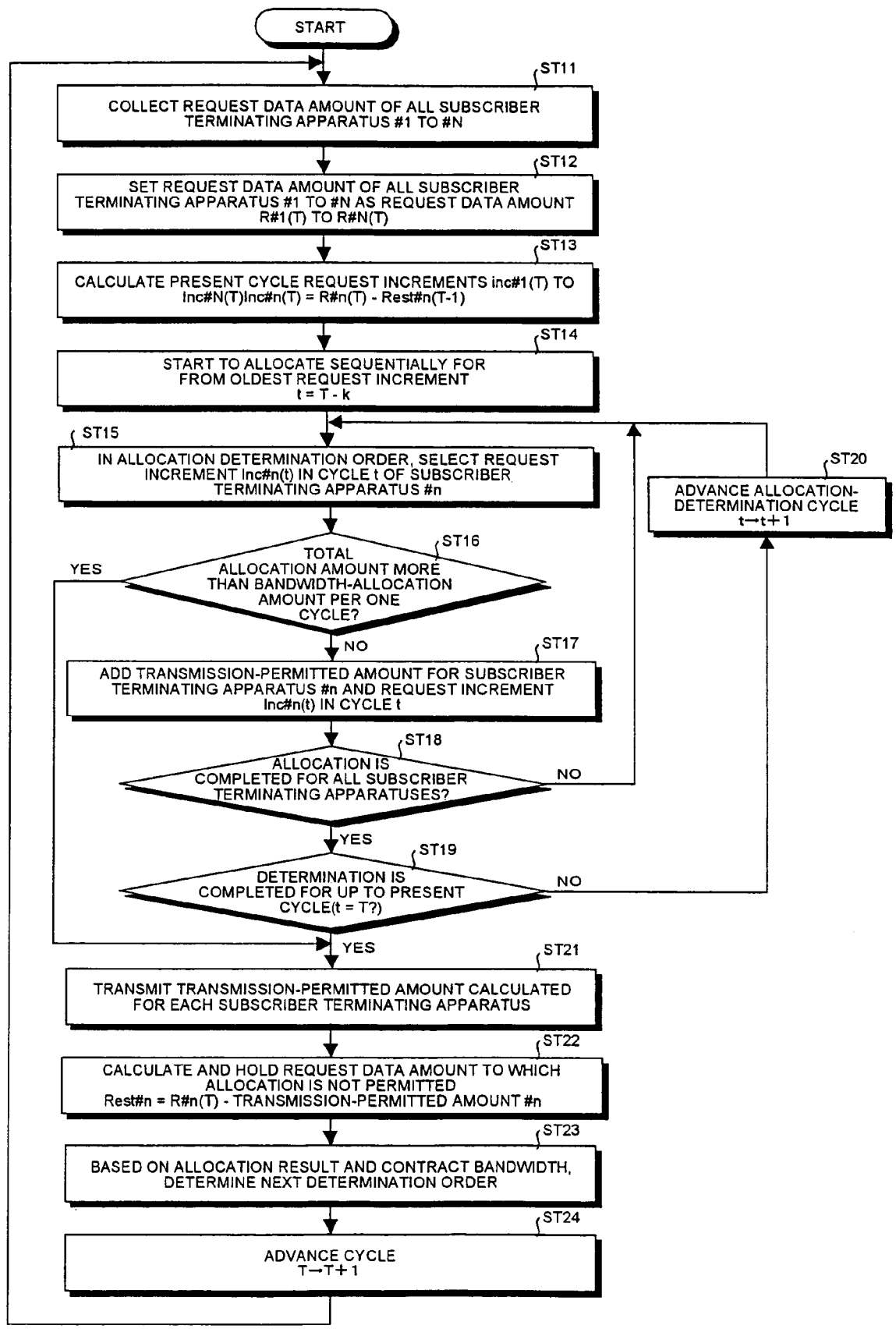
FIG. 9 is a flowchart of a processing procedure for a dynamic bandwidth-allocation operation performed by the station-side communicating apparatus shown in FIG. 5.

With reference to FIGS. 7 to 9, a description is given of how the station-side communicating apparatus 41 dynamically allocates the upload bandwidth. FIG. 8 is a schematic for illustrating a history-list creating operation in a request-data-history managing unit and a packet-data-delimitation detecting operation in an allocation determining unit included in the station-side communicating apparatus shown in FIG. 5. FIG. 9 is a flowchart of a processing procedure for a dynamic bandwidth-allocation operation performed by the station-side communicating apparatus shown in FIG. 5.

As shown in FIG. 9, the control-signal receiving unit 60 receives the control signal which includes the stored data amount transmitted by all the subscriber terminating apparatuses. After receiving the control signal, the control-signal receiving unit 60 informs the request-data-amount collecting unit 61 of the stored data amount of the subscriber terminating apparatus which is indicated in the control signal. The request-data-amount collecting unit 61 thus collects the request data amount from all the subscriber terminating apparatuses #1 to #N (step ST11).

The request-data-amount collecting unit 61 informs the request-data-history managing unit 62 of the request data amount from all the subscriber terminating apparatuses #1 to #N, which are input at a data-collection cycle T (the present cycle). The request-data-amount collecting unit 61 informs of the request data amount from the subscriber terminating apparatuses #1 to #N as the request data amounts R#1 (T) to R#N (T) in the present cycle T, respectively (step ST12).

The request-data-history managing unit 62 accumulates the request data amount from each subscriber terminating apparatus input from the request-data-amount collecting unit 61 in the bandwidth-update cycle managed by the bandwidth adjusting unit 64. At the same time, the request-data-history managing unit 62 calculates, in the sequence shown in FIG. 8, the request increment in each data-collection cycle based on the transmission-permitted amount allocated by the allocation determining unit 63, and saves a result of the calculation. The request-data-history managing unit 62 thus keeps a history of the request increment and perceives a temporal relation between each request increment. The request-data-history managing unit 62 then informs the allocation determining unit 63 of the list of the request-increment in from the oldest to the present data-collection cycle in the bandwidth-update cycle (step ST13).

Note that "in the bandwidth-update cycle" means that one bandwidth-update cycle includes a plurality of data-collection cycles. One bandwidth-update cycle may, however, correspond to one data-collection cycle. This depends on the characteristics of the communication system or the like. It is assumed here that one bandwidth-update cycle includes a plurality of data-collection cycles.

FIG. 8 shows a relation between operations including the operation in the transmission-permitted amount calculation in the T−2 cycle (the cycle before the last cycle), the operations in the request increment calculation and in the transmission-permitted amount calculation in the T−1 cycle (the last cycle), and the operation in the request increment calculation in the T cycle (the present cycle).

The transmission-permitted amount calculation in the T−2 cycle (the cycle before the last cycle) subtracts from the request data amount {R#n(T−2)} 80 in the T−2 cycle the transmission-permitted amount {#n(T−3)} 81 informed from the allocation determining unit 63 in the previous T−3 cycle. The non-allocation amount {Rest#(T−2)} 82 in the T−2 cycle is thus provided and saved.

The request increment calculation in the T−1 cycle (the last cycle) subtracts from the request data amount {R#n(T−1)} 83 in the T−1 cycle the non-allocation amount {Rest#(T−2)} 82 in the T−2 cycle (the cycle before the last cycle). The request increment {Inc#n(T−1)} 84 in the T−1 cycle is thus provided and saved. The transmission-permitted amount calculation in the T−1 cycle (the last cycle) subtracts from the request data amount {R#n(T−1)} 83 in the T−1 cycle the transmission-permitted amount {#n(T−2)} 85 informed from the allocation determining unit 63 in the previous T−2 cycle. The non-allocation amount {Rest#(T−1)} 86 in the T−1 cycle is thus provided and saved.

The request increment calculation in the T cycle (the present cycle) subtracts from the request data amount {R#n (T)} 87 in the T cycle the non-allocation amount {Rest#(T−1)} 86 in the T−1 cycle (the last cycle). The request increment {Inc#n(T)} 88 is thus provided and saved.

At step ST13 in FIG. 9, the request-data-history managing unit 62 calculates the request increments Inc#1(T) to Inc#N (T) for the request data amounts R#1(T) to R#N(T) in the T cycle (the present cycle) using the following equation: the request increment Inc#n(T)=R#n(T)−Rest#n(T−1), as mentioned above. The request-data-history managing unit 62 informs the allocation determining unit 63 of the calculated request increments.

The allocation determining unit 63 thus receives the request data amount {R#n(T)} in the T cycle (the present cycle) as the request increment {Inc#n(T−1)} in the T−1 cycle (the last cycle) plus the request increment {Inc#n(T)} in the T cycle (the present cycle). In other words, the allocation determining unit 63 receives the request data amount {R#n (T)} in the T cycle (the present cycle) which is separated into the request increment {Inc#n(T−1)} in the T−1 cycle (the last cycle) and the request increment {Inc#n(T)} in the T cycle (the present cycle). Again in other words, the allocation determining unit 63 receives the list of the request increment in from the oldest data-collection cycle (T−1 cycle) to the present data-collection cycle (T), as described above.

The allocation determining unit 63 determines the allocation in the allocation order previously set in the bandwidth adjusting unit 64. With a cycle k (k=0, 1, 2, . . . ) being set which goes back in time from the T cycle (the present cycle) and with the allocation-determination cycle t being defined as t=T−k, the allocation determining unit 63 sequentially determines the allocation for from the oldest request increment in the request increment list (step ST14).

The buffer memory unit in the subscriber terminating apparatus includes a first-in-first-out (FIFO) memory. Such a plurality of divided request increments correspond respectively to the variable-length packet data amount stored in a temporal relation in the buffer memory unit in the corresponding subscriber terminating apparatus.

The fact that the allocation determining unit 63 detects a boundary between request increments and determines the allocation for a request amount corresponds, therefore, to the fact that the allocation determining unit 63 also detects the packet data delimitation and determines the allocation for a packet data amount. The allocation determining unit 63 can thus determine allocation with the non-allocation amount Rest#n matched to the packet data amount left in the buffer memory unit in the corresponding subscriber terminating apparatus.

The request-data-history managing unit 62 manages the request increment Inc#n in each data-collection cycle. The history of the request increment has an order that matches the storage order in which the packet data is stored in the buffer memory unit in the corresponding subscriber terminating apparatus. This means that the request-data-history managing unit 62 can manage the time during which the packet data remains in the buffer memory unit in each subscriber terminating apparatus, that is to say, can manage the transmission delay time. The fact that the allocation determining unit 63 sequentially determines the allocation for from the oldest request increment corresponds, therefore, to the fact that the allocation determining unit 63 preferentially selects the packet data with a longer transmission delay time.

The allocation determining unit 63 selects, in the allocation determination order specified by the bandwidth adjusting unit 64, the request increment Inc#n(t) in the allocation-determination cycle t from the request increment list for the subscriber terminating apparatus #n (step ST15). The allocation determining unit 63 also determines whether the allocation to the subscriber terminating apparatus #n causes the total allocation amount more than a bandwidth-allocation amount per one bandwidth-update cycle (step ST16).

If the total allocation amount is equal to or less than a bandwidth-allocation amount per one bandwidth-update cycle ("NO" at step ST16), the allocation determining unit 63 adds the transmission-permitted amount allocated to the subscriber terminating apparatus #n the last time and the request increment Inc#n(t) in the allocation-determination cycle t, thereby providing the transmission-permitted amount in the allocation-determination cycle t (step ST17). It is then determined whether the allocation is completed for all the subscriber terminating apparatuses (step ST18). If the allocation is not completed for all the subscriber terminating apparatuses ("NO" at step ST18), the allocation is determined to the next subscriber terminating apparatus (steps ST15 and ST16).

With handling cycle k which goes back in time from the T cycle (the present cycle), the allocation determining unit 63 repeats the above-described determination operation until the allocation is completed for all the subscriber terminating apparatuses ("NO" at step ST18). When the allocation is completed for all the subscriber terminating apparatuses ("YES" at step ST18), the allocation determining unit 63 determines whether the determination is completed for up to the present cycle, that is, whether t=T is realized after handling the cycle k which goes back in time from the T cycle (the present cycle) (step ST19). If the determination is not completed for up to the present cycle ("NO" at step ST19), the allocation determining unit 63 advances the allocation-determination cycle to the next determination cycle t+1 (step ST20), then returning to step ST15. If the determination is completed for up to the present cycle ("YES" at step ST19), the allocation determining unit 63 proceeds to step ST21.

At step ST16 in the processes from step ST15 to step ST20, if the allocation to the subscriber terminating apparatus #n causes the total allocation amount more than a bandwidth-allocation amount per one bandwidth-update cycle ("YES" at step ST16), the allocation determining unit 63 stops the allocation-determination process, and proceeds to step ST21. The above-described allocation-determination process determines, from a plurality of request increments, the bandwidth-allocation amount for a portion of the request data amount from a subscriber terminating apparatus, that is, the bandwidth-allocation amount for one or more request increments in a plurality of separated request increments.

At step ST21, the allocation-determination process is completed, and the allocation determining unit 63 informs a transmission-permission signal generating unit 65, the request-data-history managing unit 62, and the bandwidth adjusting unit 64 of the transmission-permitted amount calculated for each subscriber terminating apparatus, as a transmission-permitted amount for each subscriber terminating apparatus in the present cycle. As a result, the transmission-permission signal generating unit 65 generates the control signal indicating the transmission-permitted amount for each subscriber terminating apparatus. A control-signal transmitting unit 66 transmits the control signal to each subscriber terminating apparatus.

After receiving the information from the allocation determining unit 63, the request-data-history managing unit 62 subtracts the informed transmission-permitted amount #n from the request data amount R#n(T) for the present cycle in the corresponding subscriber terminating apparatus. The request data amount Rest#n to which the allocation is not permitted in the present cycle is thus provided and held (step ST22). This makes it possible to previously determine the bandwidth allocated to the subscriber terminating apparatus in the next bandwidth-update cycle before moving to the next bandwidth-update cycle.

After receiving the information from the allocation determining unit 63, the bandwidth adjusting unit 64 determines the allocation-determination order in the next bandwidth-update cycle based on the contract bandwidth for each subscriber terminating apparatus and the transmission-permitted amount for each subscriber terminating apparatus informed from the allocation determining unit 63. The bandwidth adjusting unit 64 then informs the allocation determining unit 63 of the determined allocation-determination order in the next bandwidth-update cycle (step ST23).

After receiving from the bandwidth adjusting unit 64 the information on the allocation-determination order in the next bandwidth-update cycle, the allocation determining unit 63 advances the data-collection cycle in which the request increment is recorded from T to T+1, then proceeding to the allocation process in the next bandwidth-update cycle (step ST24).

According to the first embodiment, for the request data amount informed from each subscriber terminating apparatus, the station-side communicating apparatus manages the history of the request increment in each data-collection cycle. The device can thus separate the request data amount at the delimitation of the packet data, thereby making it possible to determine the allocation only for a portion of the request data amount.

For the remaining portion of the present-cycle request data amount which is the final request data amount in the bandwidth-update cycle, the allocation is originally controlled in the bandwidth allocation process for the request data amount collected in the next bandwidth-update cycle. The allocation can be determined for a portion of the request data amount as mentioned above, so that the allocation can previously be determined for the remaining portion of the present-cycle request data before moving to the next bandwidth-update cycle, thereby decreasing the load of the bandwidth allocation process in the next bandwidth-update cycle.

For the request data amount from each subscriber terminating apparatus, the delimitation of the packet data is managed based on the temporal transition. The time can thus be managed during which the packet data remains in the subscriber terminating apparatus. The allocation can therefore be preferentially performed for the packet data which remains for the longest time in the subscriber terminating apparatus, thereby decreasing the transmission waiting time of the packet data.

Figure 10:
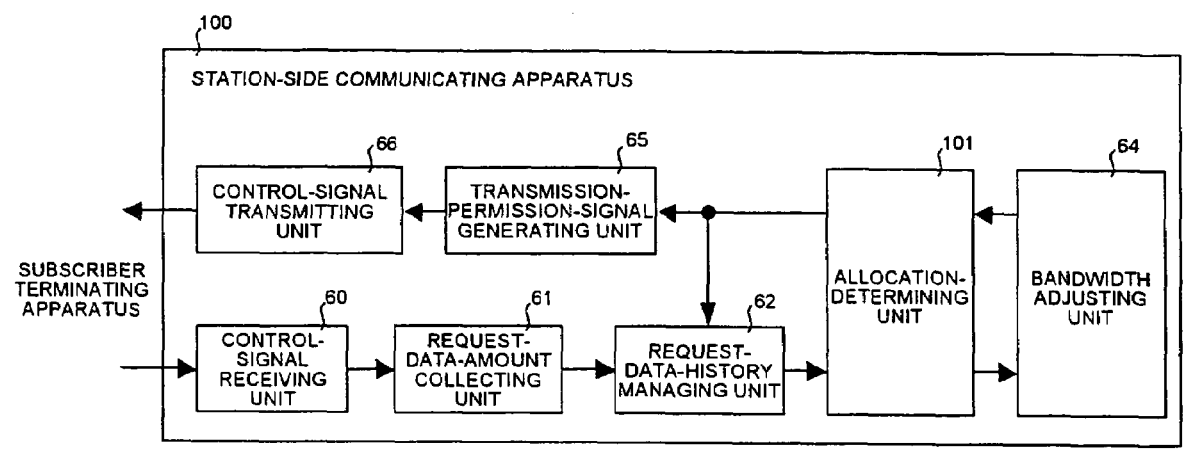
FIG. 10 is a block diagram of a station-side communicating apparatus according to a second embodiment of the present invention.

FIG. 10 is a block diagram of a station-side communicating apparatus according to a second embodiment of the present invention. The same or equivalent components as those shown in FIG. 5 (first embodiment) are referred to by the same reference numerals. The characteristic of the second embodiment will be mainly described hereinafter.

As shown in FIG. 10, the station-side communicating apparatus 100 according to the second embodiment corresponds to the configuration shown in FIG. 5 (first embodiment) in which the allocation determining unit 63 is replaced by an allocation determining unit 101.

Figure 11:
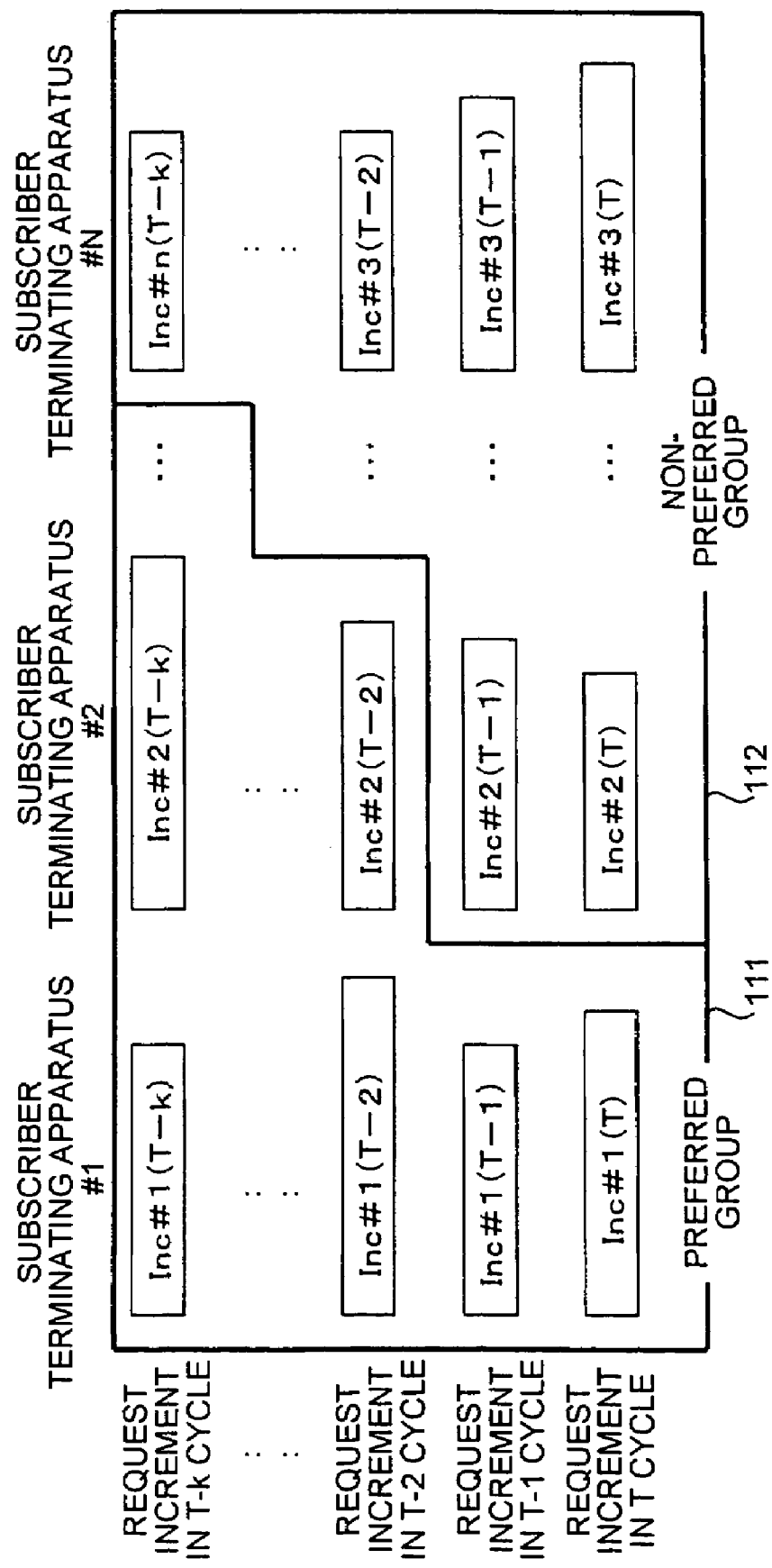
FIG. 11 is a schematic for illustrating an operation of classifying the subscriber terminating apparatuses into a preferred group and a non-preferred group in an allocation determining unit shown in FIG. 10.

FIG. 11 is a schematic for illustrating an operation of classifying the subscriber terminating apparatuses into a preferred group and a non-preferred group in an allocation determining unit shown in FIG. 10. As described in the first embodiment, the allocation determining unit 101 receives, from the request-data-history managing unit 62, the list of the request increment in from the oldest to the present data-collection cycle in the bandwidth-update cycle. As shown in FIG. 11, the allocation determining unit 101 classifies, for each request increment, all the subscriber terminating apparatuses #1 to #N into a preferred group 111 and a non-preferred group 112 depending on their contract differences. According to the grouping, the allocation determining unit 101 determines the allocation.

As shown in FIG. 11, for each request increment from the oldest T−k cycle to the present T cycle, the subscriber terminating apparatus #1 is always classified into the preferred group 111, while the other subscriber terminating apparatuses #2 to #N are classified into both the preferred group 111 and the non-preferred group 112.

Figure 12:
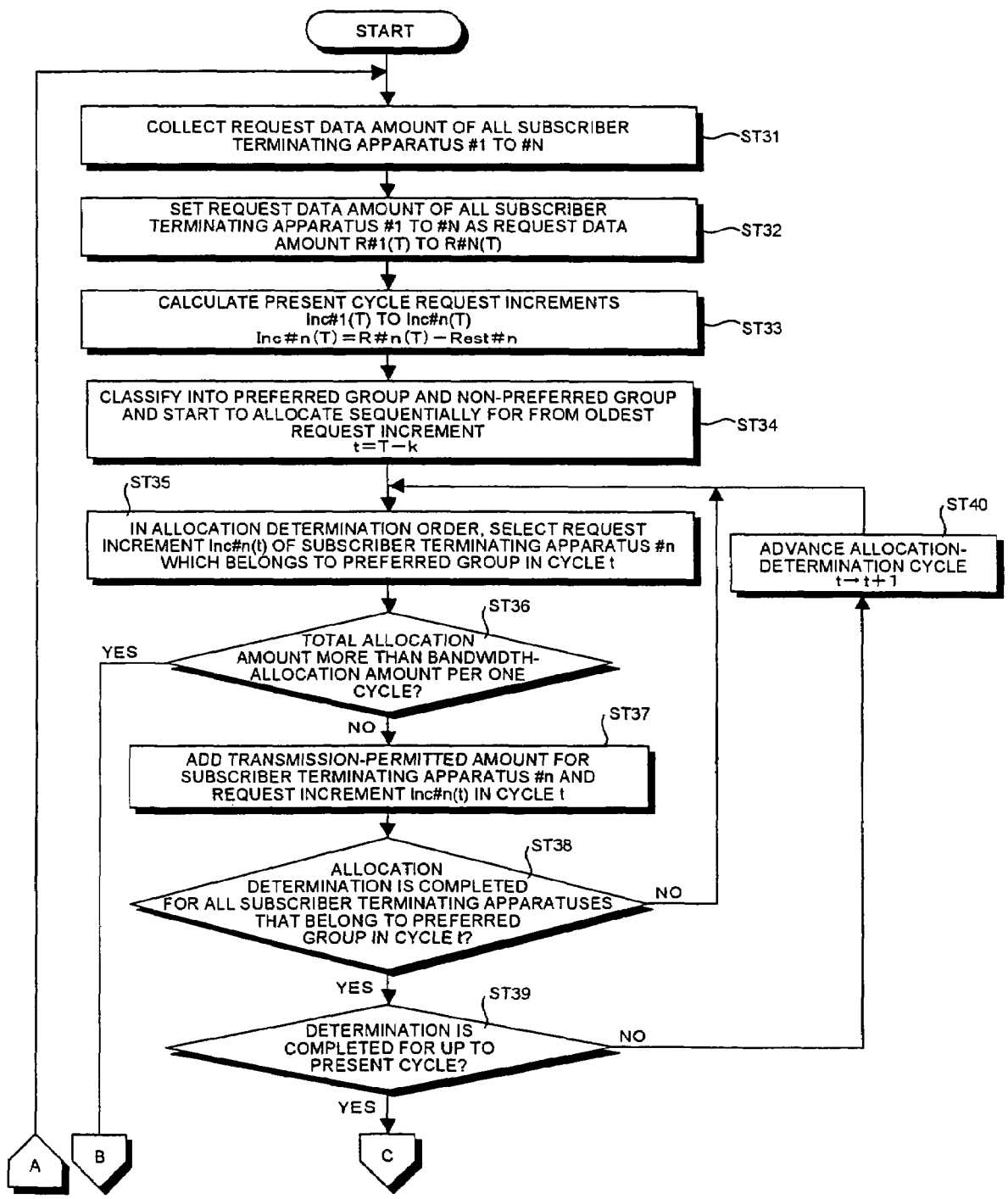
FIG. 12 is a flowchart of a processing procedure for a dynamic bandwidth-allocation operation by the station-side communicating apparatus shown in FIG. 10 (part 1)
Figure 13:
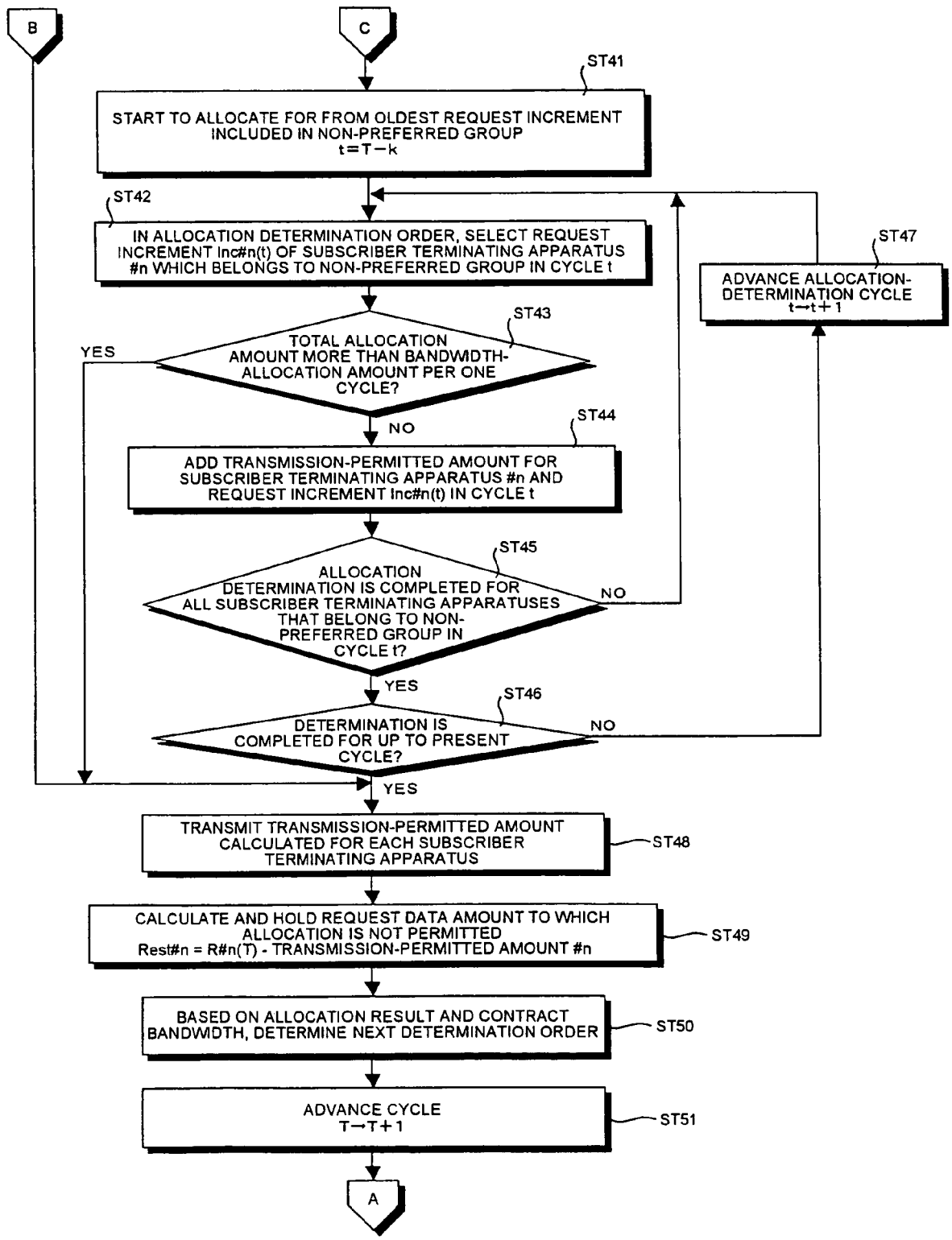
FIG. 13 is a flowchart of a processing procedure for the dynamic bandwidth-allocation operation by the station-side communicating apparatus shown in FIG. 10 (part 2).

According to FIGS. 10 and 11 and referring to FIGS. 12 and 13, a description is given of how the station-side communicating apparatus 41 dynamically allocates the upload bandwidth. FIGS. 12 and 13 are flowcharts of a processing procedure for the dynamic bandwidth-allocation operation by the station-side communicating apparatus shown in FIG. 10.

In FIGS. 12 and 13, steps ST31 to ST33 are the same as steps ST11 to step ST13 shown in FIG. 9, respectively. The process at step ST34 or more will be described. After receiving from the request-data-history managing unit 62 the list of the request increment in from the oldest to the present data-collection cycle in the bandwidth-update cycle, the allocation determining unit 101 performs the grouping as shown in FIG. 11. Then with a cycle k (k=0, 1, 2, . . . ) being set which goes back in time from the T cycle (the present cycle) and with the allocation-determination cycle t being defined as t=T−k, the allocation determining unit 101 sequentially determines the allocation for from the oldest request increment in the request increment list, which is included in the preferred group, in the order previously set in the bandwidth adjusting unit 64 (step ST14).

More specifically, in FIG. 11, the allocation is first determined for the request increment in the T−k cycle. The allocation is determined for the request increments of the subscriber terminating apparatus #1 and subscriber terminating apparatus #2 in the T−k cycle which belong to the preferred group 111. During when the allocation is determined for the preferred group 111, the allocation is not determined for the request increment in the T−k cycle of the subscriber terminating apparatus #N which belongs to the non-preferred group 112. When the allocation-determination process proceeds to the stage where the allocation is determined for the request increment in the T−1 cycle, the allocation is determined for the request increment of the subscriber terminating apparatus #1, while the allocation is not determined for the request increment of the subscriber terminating apparatus #2 which belongs to the non-preferred group 112. In this way, the allocation determining unit 101 sequentially determines the allocation for the request increment included in the preferred group 111. The allocation is determined afterward for the non-preferred group.

The allocation determining unit 101 selects, in the allocation determination order, the request increment Inc#n(t) of the subscriber terminating apparatus #n which belongs to the preferred group in the allocation-determination cycle t (step ST35). The allocation determining unit 101 also determines whether the allocation to the subscriber terminating apparatus #n causes the total allocation amount more than a bandwidth-allocation amount per one bandwidth-update cycle (step ST36).

If the total allocation amount is equal to or less than a bandwidth-allocation amount per one bandwidth-update cycle ("NO" at step ST36), the allocation determining unit 101 adds the transmission-permitted amount allocated to the subscriber terminating apparatus #n and the request increment Inc#n (t) in the allocation-determination cycle t (step ST37). It is then determined whether the allocation is completed for all the subscriber terminating apparatuses which belong to the preferred group in the allocation-determination cycle t (step ST38). If the allocation is not completed for all the subscriber terminating apparatuses ("NO" at step ST38), the allocation is determined to the next subscriber terminating apparatus which belongs to the preferred group 111 in the allocation-determination cycle t (steps ST35 and ST36).

With handling cycle k which goes back in time from the T cycle (the present cycle), the allocation determining unit 101 repeats the above-described determination operation until the allocation is completed for all the subscriber terminating apparatuses which belong to the preferred group in the allocation-determination cycle t ("NO" at step ST38). When the allocation is completed for all the subscriber terminating apparatuses which belong to the preferred group ("YES" at step ST38), the allocation determining unit 63 determines whether the determination is completed for up to the present cycle (step ST39).

If the determination is not completed for up to the present cycle ("NO" at step ST39), the allocation determining unit 101 advances the allocation-determination cycle to the next determination cycle t+1 (step ST40), then returning to step ST35. If the determination is completed for up to the present cycle ("YES" at step ST39), the allocation determining unit 101 stops the allocation-determination process for the preferred group, and proceeds to the allocation-determination process for the non-preferred group (steps ST41 to ST47).

At step ST36 in the processes from step ST35 to step ST40, if the allocation to the subscriber terminating apparatus #n causes the total allocation amount more than a bandwidth-allocation amount per one bandwidth-update cycle ("YES" at step ST36), the allocation determining unit 63 stops all subsequent allocation-determination processes, and proceeds to step ST48.

At step ST41, with a cycle k being set again which goes back in time from the T cycle (the present cycle) and with the allocation-determination cycle t being defined as t=T−k, the allocation determining unit 101 sequentially determines the allocation for from the oldest request increment in the request increment list, which is included in the non-preferred group, in the order previously set in the bandwidth adjusting unit 64.

The allocation determining unit 101 selects, in the allocation determination order, the request increment Inc#n(t) of the subscriber terminating apparatus #n which belongs to the non-preferred group in the allocation-determination cycle t (step ST42). The allocation determining unit 101 also determines whether the allocation to the subscriber terminating apparatus #n causes the total allocation amount more than a bandwidth-allocation amount per one bandwidth-update cycle (step ST43).

If the total allocation amount is equal to or less than a bandwidth-allocation amount per one bandwidth-update cycle ("NO" at step ST43), the allocation determining unit 101 adds the transmission-permitted amount allocated to the subscriber terminating apparatus #n and the request increment Inc#n (t) in the allocation-determination cycle t (step ST44). It is then determined whether the allocation is completed for all the subscriber terminating apparatuses which belong to the non-preferred group in the allocation-determination cycle t (step ST45). If the allocation is not completed for all the subscriber terminating apparatuses ("NO" at step ST45), the allocation is determined to the next subscriber terminating apparatus which belongs to the non-preferred group in the allocation-determination cycle t (steps ST42 and ST43).

With handling cycle k which goes back in time from the T cycle (the present cycle), the allocation determining unit 101 repeats the above-described determination operation until the allocation is completed for all the subscriber terminating apparatuses which belong to the non-preferred group in the allocation-determination cycle t ("NO" at step ST45). When the allocation is completed for all the subscriber terminating apparatuses which belong to the non-preferred group in the allocation-determination cycle t ("YES" at step ST45), the allocation determining unit 63 determines whether the determination is completed for up to the present cycle (step ST46).

If the determination is not completed for up to the present cycle ("NO" at step ST46), the allocation determining unit 101 advances the allocation-determination cycle to the next determination cycle t+1 (step ST47), then returning to step ST42. If the determination is completed for up to the present cycle ("YES" at step ST46), the allocation determining unit 101 stops the allocation-determination process for the non-preferred group, and proceeds to step ST48.

At step ST43 in the processes from step ST42 to step ST47, if the allocation to the subscriber terminating apparatus #n causes the total allocation amount more than a bandwidth-allocation amount per one bandwidth-update cycle ("YES" at step ST43), the allocation determining unit 63 stops all subsequent allocation-determination processes, and proceeds to step ST48.

At step ST48, the allocation-determination process is completed, and the allocation determining unit 101 informs the transmission-permission signal generating unit 65, request-data-history managing unit 62, and bandwidth adjusting unit 64 of the transmission-permitted amount calculated for each subscriber terminating apparatus, as a transmission-permitted amount for each subscriber terminating apparatus in the present cycle. As a result, the transmission-permission signal generating unit 65 generates the control signal indicating the transmission-permitted amount for each subscriber terminating apparatus. The control-signal transmitting unit 66 transmits the control signal to each subscriber terminating apparatus.

After receiving the information from the allocation determining unit 101, the request-data-history managing unit 62 subtracts the transmission-permitted amount #n from the request data amount R#n(T) for the present cycle in the corresponding subscriber terminating apparatus. The request data amount Rest#n to which the allocation is not permitted in the present cycle is thus provided and held (step ST49). This makes it possible to previously determine the bandwidth allocated to the subscriber terminating apparatus in the next bandwidth-update cycle before moving to the next bandwidth-update cycle.

After receiving the information from the allocation determining unit 101, the bandwidth adjusting unit 64 determines the allocation-determination order in the next bandwidth-update cycle based on the contract bandwidth for each subscriber terminating apparatus and the transmission-permitted amount for each subscriber terminating apparatus informed from the allocation determining unit 63. The bandwidth adjusting unit 64 then informs the allocation determining unit 63 of the determined allocation-determination order in the next bandwidth-update cycle (step ST50).

After receiving from the bandwidth adjusting unit 64 the information on the allocation-determination order in the next bandwidth-update cycle, the allocation determining unit 101 advances the data-collection cycle in which the request increment is recorded from T to T+1, then proceeding to the allocation process in the next bandwidth-update cycle (step ST51).

According to the second embodiment, as described above, the history of the request increment is classified into the preferred group and non-preferred group, and the allocation is preferentially determined for from the request increment which belongs to the preferred group. It is thus possible to relatively control the transmission delay time during which the packet data remains in the subscriber terminating apparatus.

More specifically, referring to the example shown in FIG. 11, the allocation is determined with higher priority to the subscriber terminating apparatus such as the subscriber terminating apparatus #1 which has more request increments which belong to the preferred group. This can decrease the transmission delay time during which the packet data remains in the relevant subscriber terminating apparatus. On the other hand, the allocation is determined with lower priority to the subscriber terminating apparatus such as the subscriber terminating apparatus #N which has more request increments which belong to the non-preferred group. This can increase the transmission delay time during which the packet data remains in the relevant subscriber terminating apparatus.

If the total allocation amount becomes more than a bandwidth-allocation amount per one bandwidth-update cycle, the bandwidth allocation-determination process stops the bandwidth allocation to any subsequent subscriber terminating apparatuses including the relevant subscriber terminating apparatus. To solve this problem, the second embodiment can have less request increments of the increment history that belong to the preferred group, thereby ensuring that the allocation is determined to the request increments which belong to the preferred group. In this case, by setting in the preferred group a request increment which is recorded as the data-collection cycle before a certain data-collection cycle, it is ensured that that request increment receives the allocation, thereby making it possible to set the maximum transmission-waiting time of the packet data.

Note that although the second embodiment shows an example in which the request increments are classified into two groups, the preferred group and non-preferred group, the request increments may be classified into three or more groups. In this case, different priorities for each group can provide finer control of the transmission delay time.

Although the first and second embodiments show the PON system by way of example, the present invention is not limited thereto and applies to any communication system in which the station-side communicating apparatus and a plurality of subscriber devices perform one-to-N communication through the TDMA line.

INDUSTRIAL APPLICABILITY

The present invention is suitable as a station-side communicating apparatus which dynamically performs allocation of the upload bandwidth in a communication system which performs one-to-N communication through the TDMA line.

The invention claimed is:

1. A station-side communicating apparatus that performs one-to-N communication with a plurality of subscriber devices via a time-division-multiple-access line, and controls allocation of upload bandwidth shared by the subscriber devices by acquiring bandwidth request amounts from the subscriber devices, the station-side communicating apparatus comprising:
a control signal receiving unit configured to receive a bandwidth request amount from a subscriber device in the subscriber devices;
an allocation determining unit that determines a bandwidth allocation for each of the subscriber devices in each data-collection cycle; and
a history managing unit that
calculates a request increment as a difference between the received bandwidth request amount and the bandwidth allocation for each of the subscriber devices,
stores a history of plural calculated request increments determined from more than one time of data collections and plural bandwidth allocations for each of the subscriber devices, and
calculates a target bandwidth request amount by dividing the received bandwidth request amount into the plural stored calculated request increments indicated by the history,
wherein the allocation determining unit determines the bandwidth allocation for each of the subscriber devices based on the calculated target bandwidth request amount.

2. The station-side communicating apparatus according to claim 1, wherein
the allocation determining unit determines a packet data size based on the request increments in the bandwidth request amount that is presented by the history managing unit for each of the subscriber devices, and allocates a portion of the bandwidth request amount as the bandwidth allocation based on the determined packet data size.

3. The station-side communicating apparatus according to claim 1, wherein
the allocation determining unit detects a boundary between the request increments in the bandwidth request amount that is presented by the history managing unit for each of the subscriber devices, and determines the allocation amount from the request increments when executing the bandwidth allocation for a portion of the bandwidth request amount.

4. The station-side communicating apparatus according to claim 1, wherein
when executing the bandwidth allocation for a portion of the bandwidth request amount by detecting a boundary between the request increments in the bandwidth request amount that is presented by the history managing unit for each of the subscriber devices, if the bandwidth request amount has a remaining portion for which the allocation is not performed in a present bandwidth-update cycle, the allocation determining unit determines a bandwidth to be allocated to a corresponding subscriber device in a next bandwidth-update cycle in advance using the remaining portion.

5. The station-side communicating apparatus according to claim 1, wherein
the history managing unit manages, when taking the history for each of the subscriber devices, a temporal variation of the bandwidth request amount, and disposes the request increments in the bandwidth request amount to be presented to the allocation determining unit in such a manner that a temporal relation is recognizable between the request increments, based on the temporal variation of the bandwidth request amount, and
the allocation determining unit sequentially determines the allocation for the request increments in the bandwidth request amount that is presented by the history managing unit for each of the subscriber devices from an oldest request increment.

6. The station-side communicating apparatus according to claim 1, wherein
the history managing unit manages, when taking the history for each of the subscriber devices, a temporal variation of the bandwidth request amount, and detects a transmission delay time of a packet data remains in the subscriber device, based on the temporal variation of the bandwidth request amount.

7. The station-side communicating apparatus according to claim 1, wherein
the history managing unit manages, when taking the history for each of the subscriber devices, a temporal variation of the bandwidth request amount, detects a transmission delay time of a packet data remains in the subscriber device, based on the temporal variation of the bandwidth request amount, and when the detected transmission delay time is large, and selects, as the bandwidth request amount to be presented to the allocation determining unit, the bandwidth request amount corresponding to the packet data with the large transmission delay time.

8. The station-side communicating apparatus according to claim 1, wherein the allocation determining unit classifies the request increments in the bandwidth request amount that is presented by the history managing unit for each of the subscriber devices into a plurality of groups with different priorities based on contract differences with respect to the subscriber devices, and executes the bandwidth allocation for the request increments from a group with a higher priority.

9. A station-side communicating apparatus that performs one-to-N communication with a plurality of subscriber devices via a time-division-multiple-access line, and controls allocation of upload bandwidth shared by the subscriber devices, the station-side communicating apparatus comprising:

a history managing unit that determines a first non-allocation amount as a difference between a first bandwidth request from a subscriber device in the plurality of subscriber devices and a first allocation amount allocated in response to the first bandwidth request from the subscriber device, a first request increment as a difference between a second bandwidth request from the subscriber and the first non-allocation amount, a second non-allocation amount as a difference between the second bandwidth request and a second allocation amount allocated in response to the second bandwidth request, and a second request increment as a difference between a third bandwidth request and the second non-allocation amount; and an allocation determining unit that determines a third allocation amount for the subscriber device based on the first request increment, the second request increment, and the third bandwidth request from the subscriber device.

10. A method of performing one-to-N communication with a plurality of subscriber devices via a time-division-multiple-access line, the method comprising:

determining a first non-allocation amount as a difference between a first bandwidth request from a subscriber device in the plurality of subscriber devices and a first allocation amount allocated in response to the first bandwidth request from the subscriber device;

determining a first request increment as a difference between a second bandwidth request from the subscriber and the first non-allocation amount;

determining a second non-allocation amount as a difference between the second bandwidth request and a second allocation amount allocated in response to the second bandwidth request;

determining a second request increment as a difference between a third bandwidth request and the second non-allocation amount;

storing, in a storage device, the first and second request increments; and determining a third allocation amount for the subscriber device based on the stored first request increment, the stored second request increment, and the third bandwidth request from the subscriber device.

11. The station-side communicating apparatus according to claim 9, wherein the allocation determining unit determines a packet data size based on the first request increment and the second request increment determined by the history managing unit for each of the subscriber devices, and determines the third allocation amount for the subscriber device based on the determined packet data size.

12. The method of performing one-to-N communication according to claim 10, further comprising:

determining a packet data size based on the first request increment and the second request increment; and the determining the third allocation amount is performed based on the packet size.

* * * * *

UNITED STATES PATENT AND TRADEMARK OFFICE
CERTIFICATE OF CORRECTION

PATENT NO. : 7,653,080 B2 Page 1 of 1
APPLICATION NO. : 10/563157
DATED : January 26, 2010
INVENTOR(S) : Takemoto et al.

It is certified that error appears in the above-identified patent and that said Letters Patent is hereby corrected as shown below:

On the title page, Item (87), the PCT Publication Date is incorrect. Item (87) should read:

-- (87)  PCT Pub. No.: WO2005/027428

PCT Pub. Date: Mar. 24, 2005 --

Signed and Sealed this

Thirteenth Day of April, 2010

David J. Kappos
*Director of the United States Patent and Trademark Office*